(12) United States Patent
Kim (10) Patent No.: US 12,337,655 B2
(45) Date of Patent: Jun. 24, 2025

(54) METHOD FOR CONTROLLING AIR MANAGEMENT SYSTEM OF ECO-FRIENDLY VEHICLE

(71) Applicants: Hyundai Motor Company, Seoul (KR); Kia Corporation, Seoul (KR)

(72) Inventor: Jin Yong Kim, Daegu (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 143 days.

(21) Appl. No.: 18/384,740

(22) Filed: Oct. 27, 2023

(65) Prior Publication Data

US 2024/0416720 A1 Dec. 19, 2024

(30) Foreign Application Priority Data

Jun. 16, 2023 (KR) ................ 10-2023-0077622

(51) Int. Cl.
*B60H 1/00* (2006.01)
(52) U.S. Cl.
CPC ................ *B60H 1/00878* (2013.01)
(58) Field of Classification Search
CPC ............ B60H 1/00878; B60H 1/00785; B60G 2202/152; B60G 2500/205; B60G 17/0408; B60T 17/006; B60T 17/003; B60L 1/003; B60L 2240/662; B60L 2260/40; B60Y 2200/91

See application file for complete search history.

(56) References Cited

U.S. PATENT DOCUMENTS 9,254,826 B2 * 2/2016 Jin .................... B60T 17/004
2020/0318543 A1 * 10/2020 Kim .................... B01D 46/88

FOREIGN PATENT DOCUMENTS

| KR | 10-2014-0078172 | | 6/2014 | |
| KR | 20140078172 A | * | 6/2014 | ........... B60T 17/004 |
| KR | 20210023346 A | * | 3/2021 | |

* cited by examiner

Primary Examiner — Emmanuel E Duke
(74) Attorney, Agent, or Firm — Morgan, Lewis & Bockius LLP

(57) ABSTRACT

A method for controlling an air management system (AMS) of an eco-friendly vehicle includes controlling the AMS in different control modes, namely the energy efficiency mode, normal mode, first anti-freezing mode, and second anti-freezing mode, based on ambient temperature, humidity, APU temperature, and compressor duty cycle.

18 Claims, 6 Drawing Sheets

| APU operation mode | purge valve | first control valve | second control valve | note |
|---|---|---|---|---|
| charge | OFF | OFF | OFF | when compressor is operating |
| regeneration | ON | ON | ON | when regenerating after charge |
| standby | OFF | ON | OFF | after ending regeneration |

METHOD FOR CONTROLLING AIR MANAGEMENT SYSTEM OF ECO-FRIENDLY VEHICLE

CROSS REFERENCE TO RELATED APPLICATION

The present application claims priority to Korean Patent Application No. 10-2023-0077622, filed Jun. 16, 2023, the entire contents of which is incorporated herein for all purposes by this reference.

BACKGROUND OF THE PRESENT DISCLOSURE

Field of the Present Disclosure

The present disclosure relates to a technology for controlling the air management system (AMS) provided in an eco-friendly vehicle.

Description of Related Art

Commercial vehicles such as buses and trucks are provided with AMS to secure compressed air for use in braking systems and air suspension.

The AMS consists of a compressor that produces compressed air, an air processing unit (APU) that removes impurities and moisture from compressed air, and an air tank that stores compressed air.

As eco-friendly commercial vehicles are increasingly using electric motors instead of internal combustion engines, the compressors that were previously driven by internal combustion engines are now being replaced by electric compressors driven by a separate motor.

The electric compressors used in eco-friendly vehicles have a relatively lower discharge air temperature compared to the compressors connected to traditional internal combustion engines, as the operation of the electric compressors is significantly reduced due to regenerative braking in eco-friendly vehicles and there is no transfer of heat from the internal combustion engine.

In eco-friendly vehicles provided with electric compressors, the compressed air is directed to the APU for purification and moisture removal before being stored in the air tank, but operating in cold regions can lead to potential blockages in the pipelines between the compressor and APU, or between the APU and the air tank due to the freezing of moisture.

The main cause of this is, as aforementioned, the significantly lower temperature of the compressed air discharged from the electric compressors used in eco-friendly vehicles compared to traditional ones.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method for controlling the AMS of an eco-friendly vehicle which is configured for effectively preventing freezing along the path where the compressed air produced by the electric compressor is transferred to the air tank, ensuring reliability and stability of the AMS and ultimately enhancing the marketability of the vehicle.

To accomplish the above object, a method for controlling an air management system (AMS) of an eco-friendly vehicle according to an exemplary embodiment of the present disclosure includes operating the AMS in an energy efficiency mode, a normal mode, a first anti-freezing mode, and a second anti-freezing mode with different air processing unit (APU) regeneration rates based on ambient temperature, humidity, APU temperature, and compressor duty cycle.

The energy efficiency mode may be a mode improving energy efficiency of the vehicle by being performed in a situation with no need for anti-freezing or for enhancement of dehumidification, the normal mode may be controlled with a higher APU regeneration rate than the energy efficiency mode in response that the dehumidification is required but the anti-freezing is not necessary, the first anti-freezing mode may be controlled with a higher APU regeneration rate than the normal mode in response that the anti-freezing is required in a section from a compressor to an APU, the APU regeneration rate being increased within a range below a predetermined upper limit regeneration rate while the compressor duty cycle is less than a predetermined first threshold duty cycle; and the second anti-freezing mode may be controlled with a higher APU regeneration rate than the normal mode in response that the anti-freezing is required in a section from the APU to the air tank.

The energy efficiency mode may be performed based on the ambient temperature being higher than a predetermined first threshold temperature and the humidity being lower than a predetermined first threshold humidity.

The normal mode may be performed based on the ambient temperature being equal to or greater than a predetermined second threshold temperature lower than the predetermined first threshold temperature and the humidity being equal to or greater than the predetermined first threshold humidity but equal to or lower than a predetermined second threshold humidity higher than the predetermined first threshold humidity.

The first anti-freezing mode is performed based on the ambient temperature being lower than the predetermined second threshold temperature, the humidity being higher than the second threshold humidity, and the APU temperature being lower than a predetermined third threshold temperature.

In the first anti-freezing mode, the APU regeneration rate may be increased from a predetermined starting regeneration rate by a predetermined regeneration rate increment within a range below an upper limit regeneration rate based on the compressor duty cycle being less than a first threshold duty cycle, and the compressor duty cycle is determined at predetermined first threshold time intervals to increase the APU regeneration rate at the first threshold time intervals.

The second anti-freezing mode may be performed based on the ambient temperature being lower than the predetermined second threshold temperature, the humidity being higher than the second threshold humidity, the APU temperature being equal to or greater than the predetermined third threshold temperature, and the compressor duty cycle being greater than a predetermined second threshold duty.

The compressor duty cycle for comparison with the predetermined second threshold duty cycle is determined at predetermined second threshold time intervals.

Also, to accomplish the above object, a method for controlling an air management system (AMS) of an eco-friendly vehicle according to an exemplary embodiment of the present disclosure includes controlling the system in an energy efficiency mode with a predetermined first air processing unit (APU) regeneration rate based on an ambient temperature being higher than a predetermined first threshold temperature and a humidity being lower than a predetermined first threshold humidity, controlling the system in a normal mode with a predetermined second APU regeneration rate higher than the predetermined first APU regeneration rate based on the ambient temperature being equal to or greater than a predetermined second threshold temperature lower than the predetermined first threshold temperature and the humidity being equal to or lower than a predetermined second threshold humidity higher than the predetermined first threshold humidity, controlling the system in a first anti-freezing mode increasing the APU regeneration rate from a predetermined starting regeneration rate higher than the predetermined second APU regeneration rate in a range below a predetermined upper limit regeneration rate while a compressor duty cycle is less than a predetermined first threshold duty cycle based on the ambient temperature being lower than the predetermined second threshold temperature, the humidity being higher than the second threshold humidity, and an APU temperature being lower than a predetermined third temperature; and controlling the system in a second anti-freezing mode with a predetermined third APU regeneration rate higher than the predetermined second APU regeneration rate based on the ambient temperature being lower than the predetermined second threshold temperature, the humidity being higher than the second threshold humidity, the APU temperature being the predetermined third threshold temperature, and the compressor duty cycle being greater than a predetermined second threshold duty cycle.

The APU regeneration rate may be controlled, in the first anti-freezing mode, to increase by a predetermined regeneration rate increment at predetermined first threshold time intervals.

In the first anti-freezing mode, the compressor duty cycle may be determined at the predetermined first threshold time intervals and compared with the predetermined first threshold duty cycle to increase APU regeneration rate at each first threshold time interval.

In the second anti-freezing mode, the compressor duty cycle to be compared with the predetermined second threshold duty cycle may be determined at predetermined second threshold time intervals.

The APU regeneration rate may be determined as the ratio of the air amount used for regenerating a dehumidification cartridge of the APU to the air amount charged in an air tank.

The present disclosure is configured for effectively prevents freezing along the path where the compressed air produced by the electric compressor is transferred to the air tank in eco-friendly vehicles, ensuring reliability and stability of the AMS and ultimately enhancing the marketability of the vehicles.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, descriptions are made of the exemplary embodiments included in the present specification with reference to the accompanying drawings in which the same reference numbers are assigned to refer to the same or like components and redundant description thereof is omitted.

As used in the following description, the suffix "module" and "unit" are granted or used interchangeably in consideration of easiness of description but, by itself, including no distinct meaning or role.

Furthermore, detailed descriptions of well-known technologies related to the exemplary embodiments included in the present specification may be omitted to avoid obscuring the subject matter of the exemplary embodiments included in the present specification. Furthermore, the accompanying drawings are only for easy understanding of the exemplary embodiments included in the present specification and do not limit the technical spirit included herein, and it should be understood that the exemplary embodiments include all changes, equivalents, and substitutes within the spirit and scope of the present disclosure.

As used herein, terms including an ordinal number such as "first" and "second" may be used to describe various components without limiting the components. The terms are used only for distinguishing one component from another component.

It will be understood that when a component is referred to as being "connected to" or "coupled to" another component, it may be directly connected or coupled to the other component or intervening component may be present. In contrast, when a component is referred to as being "directly connected to" or "directly coupled to" another component, there are no intervening component present.

As used herein, the singular forms are intended to include the plural forms as well, unless the context clearly indicates otherwise.

It will be further understood that the terms "comprises" or "has," when used in the present specification, specify the presence of a stated feature, number, step, operation, component, element, or a combination thereof, but they do not preclude the presence or addition of one or more other features, numbers, steps, operations, components, elements, or combinations thereof.

Figure 1:
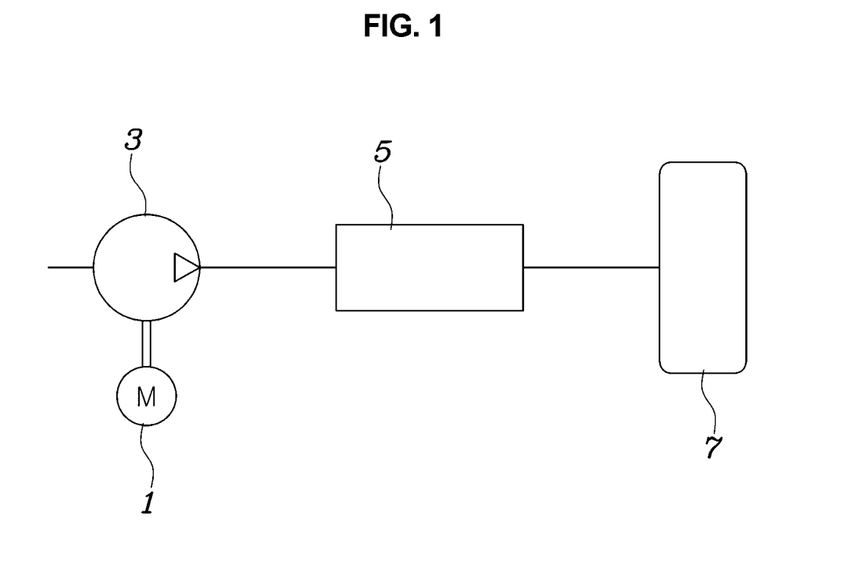
FIG. 1 is a diagram illustrating a configuration of an AMS to which an exemplary embodiment of the present disclosure is applicable.

FIG. 1 is a schematic diagram illustrating a configuration of an AMS to which an exemplary embodiment of the present disclosure is applicable, and the AMS includes a compressor 3 producing compressed air using the power of a motor 1, an APU 5 removing impurities and moisture from the compressed air produced by the compressor 3, and an air tank 7 storing the compressed air passing through the APU 5.

For reference, although not shown in the drawing, the compressed air that passes through the APU 5 may be charged to the air tank 7 and simultaneously supplied to other loads.

The APU 5 includes a dehumidification cartridge 13.

Figure 2:
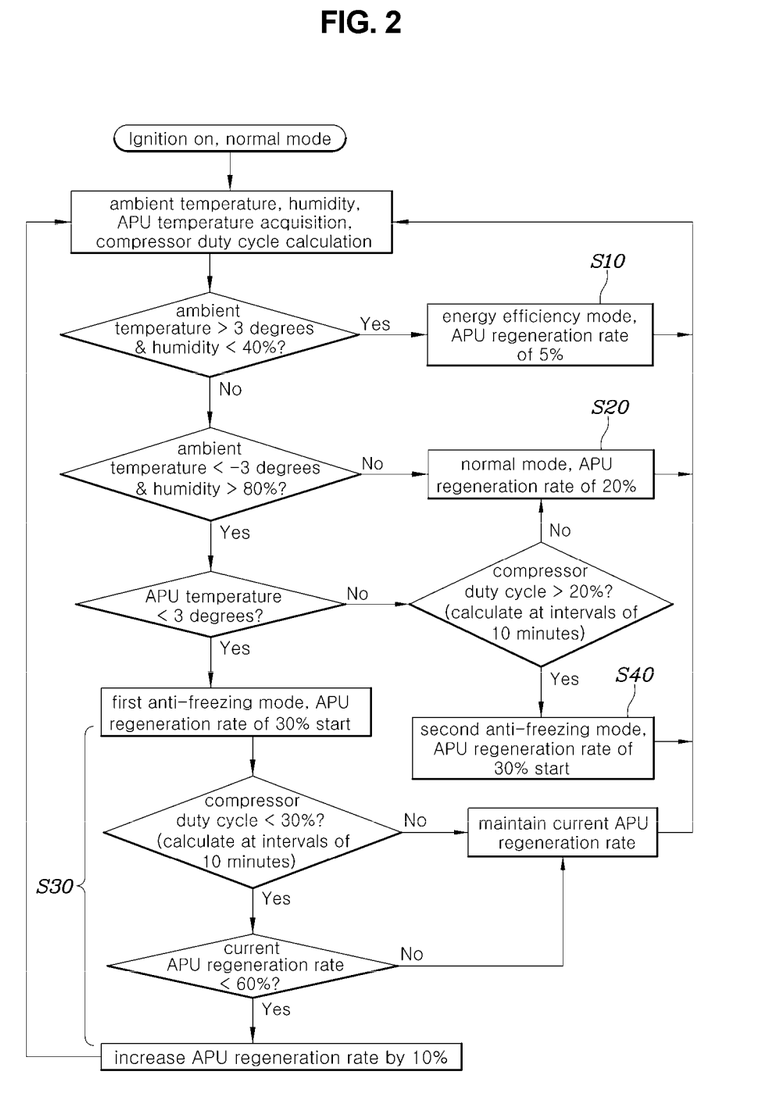
FIG. 2 is a flowchart illustrating a method for controlling an AMS of an eco-friendly vehicle according to various exemplary embodiments of the present disclosure.
Figure 3:
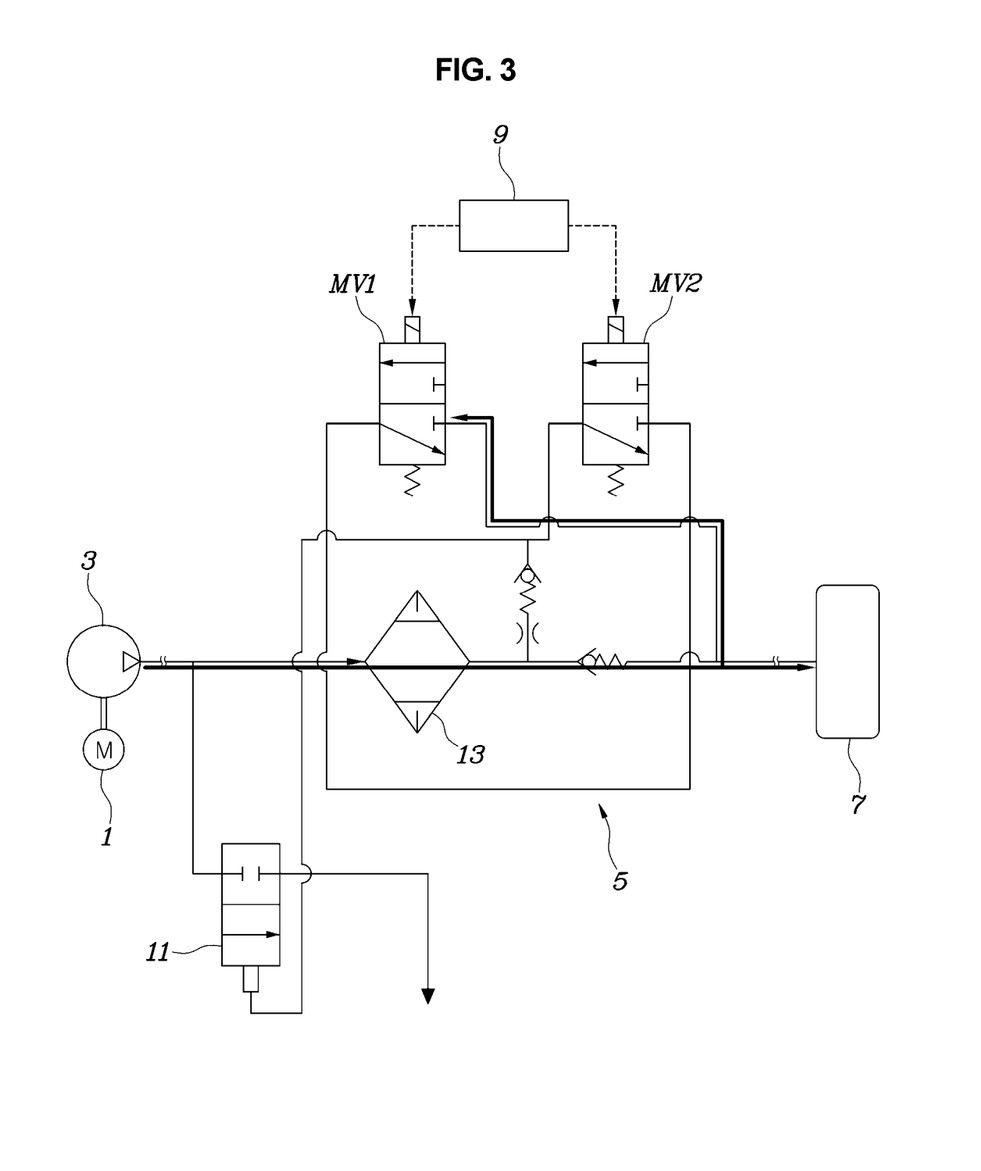
FIG. 3 is a diagram illustrating the details of the APU in FIG. 1 in a charging mode where the compressed air produced by the compressor is charged to the air tank.
Figure 4:
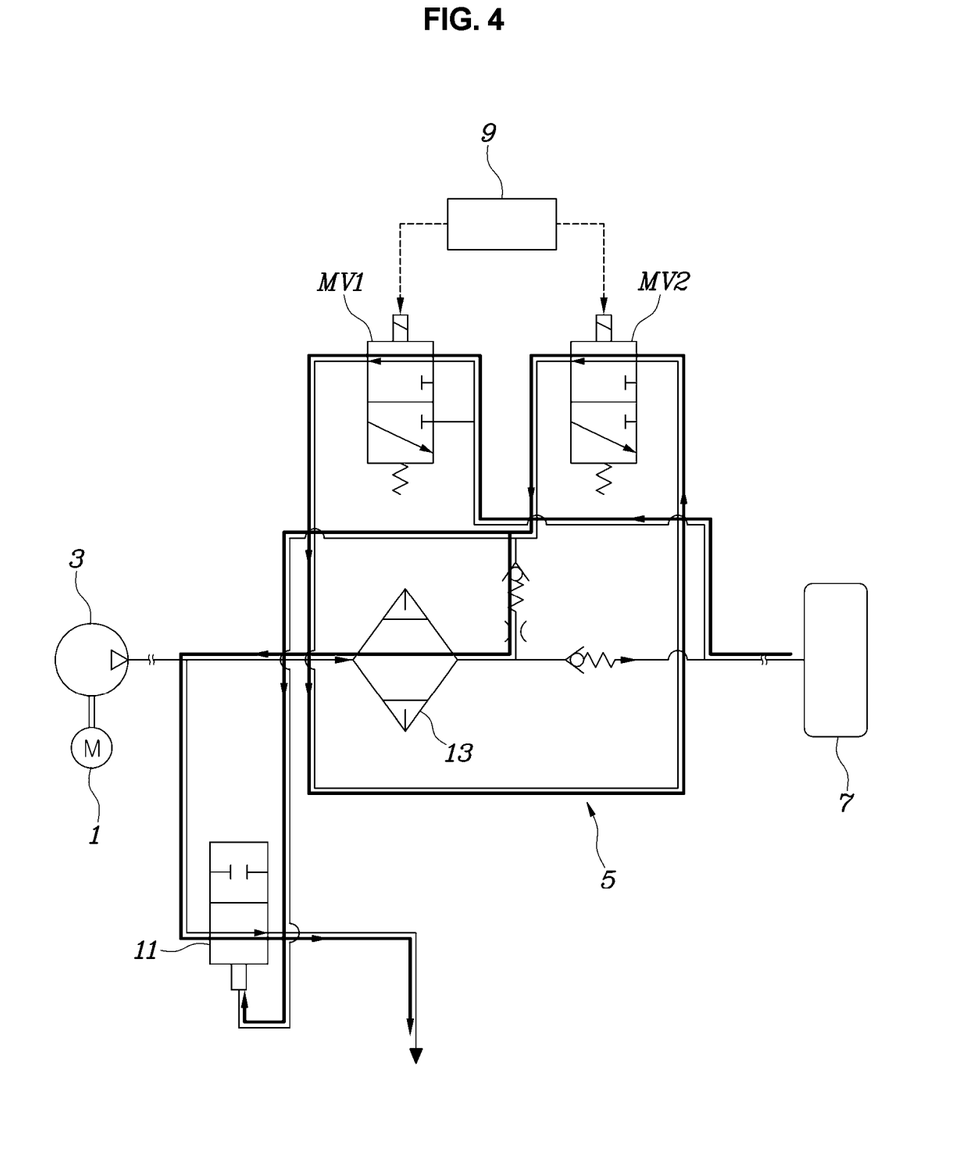
FIG. 4 is a diagram illustrating a regeneration mode for regenerating the APU of FIG. 3.
Figure 5:
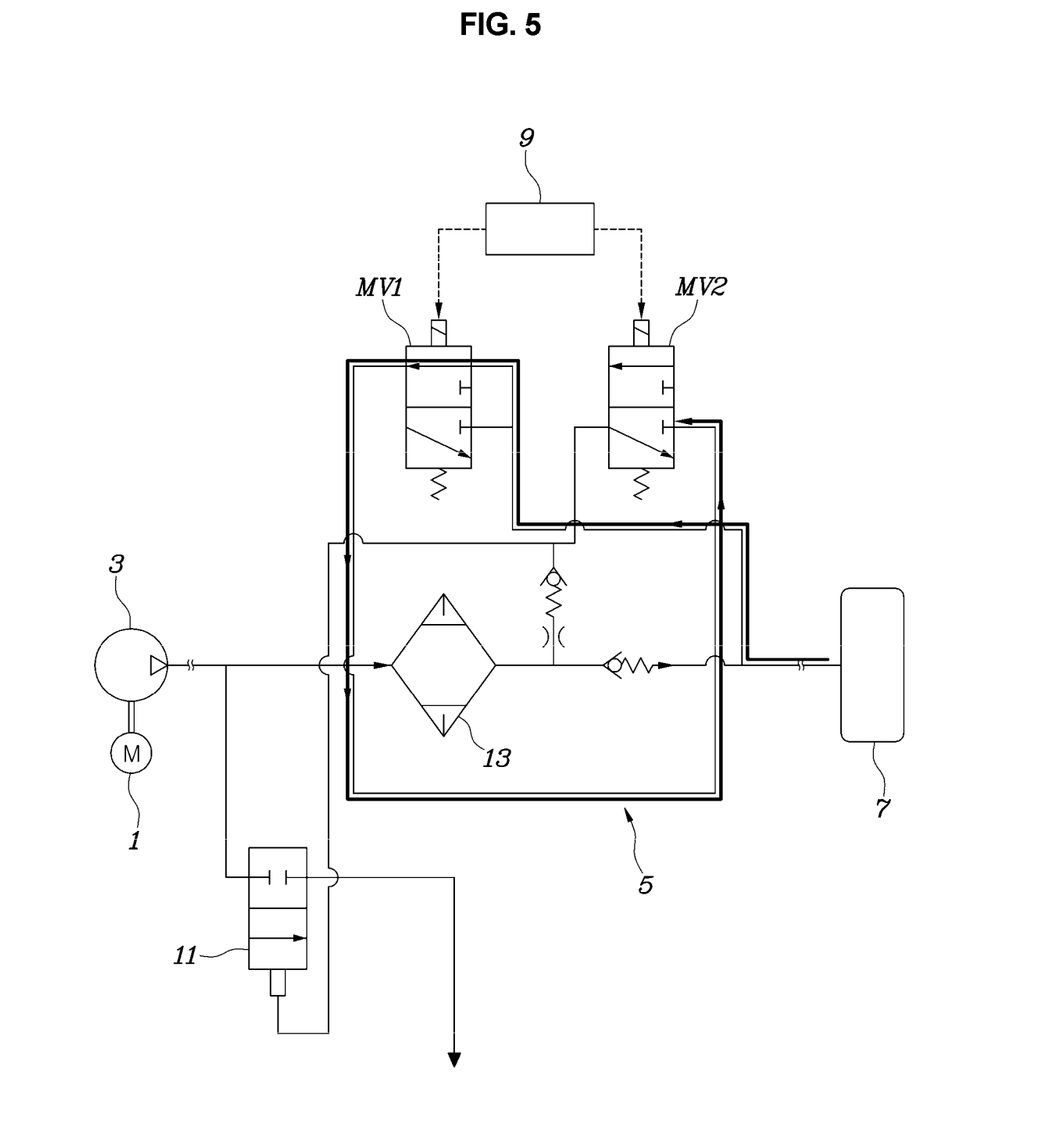
FIG. 5 is a diagram illustrating a standby mode for controlling the APU of FIG. 3 in a standby state.

FIG. 2 is a flowchart illustrating an AMS control method for an eco-friendly vehicle according to various exemplary embodiments of the present disclosure, and FIG. 3, FIG. 4, and FIG. 5 are diagrams illustrating the details of the APU 5 in FIG. 1 in different operating modes.

That is, the APU operates in a repetitive cycle of charging mode, regeneration mode, and standby mode, FIG. 3 represents the charging mode in which the compressed air produced by the compressor 3 is charged into the air tank 7, FIG. 4 represents the regeneration mode in which the dehumidification cartridge 13 is regenerated, and FIG. 5 represents the standby mode following immediately after regeneration.

Figure 6:
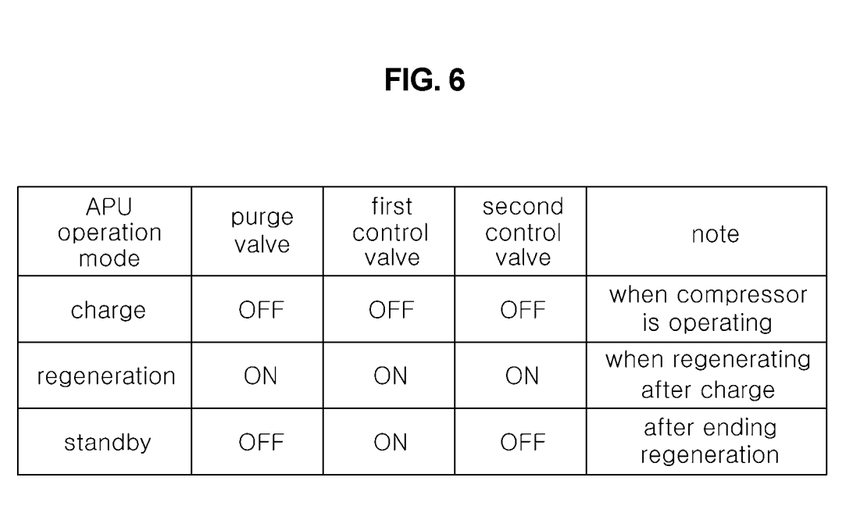
FIG. 6 is a table summarizing ON/OFF states of valves implementing the APU operating modes.

The control of the AMS is performed by the controller 9, which is configured to control the first control valve MV1 and the second control valve MV2 electrically connected to the controller 9 to repetitively form the states of charging, regeneration, and standby, and FIG. 6 is a table summarizing the operating modes and ON/OFF states of the valves in the APU.

For example, the controller 9 is configured to control the compressor 3 via the motor 1 electrically connected to the controller 9.

As shown in FIG. 6, during the implementation of the regeneration mode, the first control valve MV1, the second control valve MV2, and the purge valve 11 are all in the ON state.

Here, the regeneration mode for regenerating the dehumidification cartridge 13 of the APU refers to the mode in which dry compressed air, free from moisture stored in the air tank 7, is supplied in reverse direction to the dehumidification cartridge 13 as exemplified in FIG. 4, to remove moisture from the dehumidification cartridge 13.

With reference to FIG. 2, a method for controlling the AMS of an eco-friendly vehicle according to an exemplary embodiment of the present disclosure operates in different modes: energy efficiency mode, normal mode, first anti-freezing mode, and second anti-freezing mode, with the APU regeneration rate being controlled differently based on ambient temperature, humidity, APU temperature, and duty cycle of the compressor 3.

In an exemplary embodiment of the present invention, the ambient temperature, the humidity, and the APU temperature are each measured by sensors, and duty cycle of the compressor is calculated by the controller as the ratio of the compressor's operating time during a unit time, as described below.

Here, the duty cycle of the compressor 3 refers to the ratio of the operating time of the compressor 3 during a unit time, e.g., 10 minutes. That is, when the operating time of the compressor 3 during a 10-minute interval is 4 minutes, then the duty cycle of the compressor 3 is 40%.

The APU regeneration rate may be determined as the ratio of the amount of air used for regenerating the APU dehumidification cartridge 13 to the total amount of air charged into the air tank 7.

Therefore, a higher APU regeneration rate results in a higher duty cycle of the compressor 3, leading to a decrease in the energy efficiency of the vehicle.

For reference, in the energy efficiency mode, normal mode, first anti-freezing mode, and second anti-freezing mode, the practical method of controlling the APU regeneration rate differently may be implemented by controlling the duration during which the first control valve MV1, second control valve MV2, and purge valve 11 are turned on.

The energy efficiency mode is a mode aimed at improving the energy efficiency of the vehicle and is performed in situations where anti-freezing and enhanced dehumidification are not required, while the normal mode is controlled by the controller with a higher APU regeneration rate than the energy efficiency mode in situations where anti-freezing is not required but enhanced dehumidification is necessary.

Furthermore, the first anti-freezing mode is controlled by the controller with a higher APU regeneration rate than the normal mode in situations where anti-freezing is required from the compressor 3 to the APU, and the APU regeneration rate is gradually increased within a range below an upper limit regeneration rate while the duty cycle of the compressor 3 is below a predetermined first threshold duty cycle; the second anti-freezing mode is controlled by the controller with a higher APU regeneration rate than the normal mode in situations where anti-freezing is required from the APU to the air tank 7.

Here, the energy efficiency mode is activated when the ambient temperature is higher than a predetermined first threshold temperature and the humidity is lower than a predetermined first threshold humidity.

That is, by operating in the energy efficiency mode under conditions where the ambient temperature is higher than the predetermined first threshold temperature, eliminating concerns about freezing, and the humidity is lower than the predetermined first threshold humidity, allowing for lower APU regeneration rates without significant issues in dehumidification, it is possible to enhance the vehicle's energy efficiency.

Therefore, the predetermined first threshold temperature may be set to a level that does not pose a risk of freezing to the AMS, and the predetermined first threshold humidity may be set to a level that does not poses a problem with dehumidification even with a significantly low APU regeneration rate, in accordance with the aforementioned principles, which may be determined through multiple experiments and interpretations in a design-oriented manner.

For example, the predetermined first threshold temperature is set to 3 degrees, and the predetermined first threshold humidity is set to 40% in the exemplary embodiment of FIG. 2.

The normal mode is activated when the ambient temperature is equal to or greater than a predetermined second threshold temperature lower than the predetermined first threshold temperature and the humidity is equal to or greater than the predetermined first threshold humidity but equal to or lower than a predetermined second threshold humidity higher than the predetermined first threshold humidity.

In an exemplary embodiment of the present disclosure, the normal mode serves as the default mode for AMS control when the vehicle is turned on as shown in FIG. 2.

The predetermined second threshold temperature is set to a lower temperature than the predetermined first threshold temperature, at a level where the possibility of freezing is considered to be low, while the second threshold humidity is set higher than the predetermined first threshold humidity, indicating a level where it is considered necessary to strengthen the dehumidification.

Therefore, the predetermined second threshold temperature and second threshold humidity may also be determined in a design-oriented manner through multiple experiments and interpretations, in accordance with the aforementioned principles; for example, the predetermined second threshold temperature is set to −3 degrees and the second threshold humidity is set to 80% in the exemplary embodiment of FIG. 2.

The first anti-freezing mode is activated when the ambient temperature is lower than the predetermined second threshold temperature, the humidity is higher than the second threshold humidity, and the APU temperature is lower than a predetermined third threshold temperature.

As described above, the first anti-freezing mode is activated when there is a high concern for freezing in the section from the compressor 3 to the APU and a need to prevent freezing, and the predetermined third threshold temperature is set to ensure a more accurate assessment of the possibility of freezing in the section from the compressor 3 to the APU.

That is, the predetermined third threshold temperature may be determined in a design-oriented manner through multiple experiments and interpretations, in accordance with the aforementioned principles; for example, the predetermined third threshold temperature is set to 3 degrees in the exemplary embodiment of FIG. 2.

In the first anti-freezing mode, when the duty cycle of the compressor 3 is less than the predetermined first threshold duty cycle, the APU regeneration rate is increased from a predetermined starting regeneration rate by a predetermined regeneration rate increment within the range below the upper limit regeneration rate.

Here, the predetermined first threshold duty cycle may be set considering that there is no freezing occurrence in the section from the compressor 3 to the APU when the APU regeneration rate is equal to or greater than the predetermined starting regeneration rate.

That is, by utilizing the predetermined first threshold duty cycle and the starting regeneration rate, which are set in consideration of the tendency for the duty cycle of the compressor 3 to increase as the APU regeneration rate increases and for the temperature of the compressed air outputted from the compressor 3 to increase as the duty cycle of the compressor 3 increases, the APU may be controlled effectively to prevent freezing in the section from the compressor 3 to the APU.

Therefore, the predetermined first threshold duty cycle and starting regeneration rate may be determined through multiple experiments and interpretations in consideration of the above-described relationship, and in the exemplary embodiment of FIG. 2, the predetermined first threshold duty cycle and the starting regeneration rate are both set to 30%.

Also, the upper limit regeneration rate may be determined in a design-oriented manner through multiple experiments and interpretations to ensure a stable supply of compressed air required during vehicle operation.

For example, the upper limit regeneration rate is set to 60% in the exemplary embodiment of FIG. 2.

Meanwhile, the duty cycle of the compressor 3 is determined in a first threshold time unit, allowing the increase in APU regeneration rate to occur in the first threshold time unit, and in the exemplary embodiment of FIG. 2, the first threshold time is set to 10 minutes, which may be appropriately adjusted considering the condition of each component forming AMS.

Furthermore, it is preferable for the regeneration rate increment, occurring at the first threshold time interval, to effectively prevent freezing in the AMS by gradually increasing the APU regeneration rate while avoiding excessive and rapid increases that could negatively impact energy efficiency, and the regeneration rate increment may be determined through multiple experiments and interpretations in a design-oriented manner.

For example, the regeneration rate increment is set to 10% in the exemplary embodiment of FIG. 2.

The second anti-freezing mode is activated when the ambient temperature is lower than the predetermined second threshold temperature, the humidity is higher than the second threshold humidity, the APU temperature is equal to or greater than the predetermined third threshold temperature, and the duty cycle of the compressor 3 is greater than a predetermined second threshold duty cycle.

The second anti-freezing mode is performed to prevent freezing in the section between the APU and the air tank 7 when there is a concern for freezing as described above, when the humidity is higher than the second threshold humidity and the ambient temperature is lower than the predetermined second threshold temperature when a significant amount of compressed air passes through the section between the APU and the air tank 7 because of the duty cycle of the compressor 3 exceeding the predetermined second threshold duty cycle even though it is determined that there is no concern about freezing from the compressor 3 to the APU because of the APU temperature is higher than the predetermined third threshold temperature in spite of the ambient temperature lower than the predetermined second threshold temperature.

Therefore, the predetermined second threshold duty cycle may be determined through multiple experiments and interpretations in consideration of the mentioned intention, and for example, the predetermined second threshold duty cycle is set to 20% in the exemplary embodiment of FIG. 2.

Here, the duty cycle of the compressor 3, which is compared with the predetermined second threshold duty cycle, may be determined in a predetermined second threshold time unit of comparison, and for example, the second threshold time is set to 10 minutes in the exemplary embodiment of FIG. 2.

Meanwhile, a method for controlling the AMS of an eco-friendly vehicle according to an exemplary embodiment of the present disclosure may referred to as follows.

That is, a method for controlling the AMS of an eco-friendly vehicle according to an exemplary embodiment of the present disclosure includes controlling the system in an energy efficiency mode at step S10 with a predetermined first APU regeneration rate when the ambient temperature is higher than a predetermined first threshold temperature and the humidity is lower than a predetermined first threshold humidity; controlling the system in a normal mode at step S20 with a predetermined second APU regeneration rate higher than the predetermined first APU regeneration rate when the ambient temperature is equal to or greater than a predetermined second threshold temperature lower than the predetermined first threshold temperature and the humidity is equal to or greater than the predetermined first threshold humidity but lower than a predetermined second threshold humidity higher than the predetermined first threshold humidity; controlling the system in a first anti-freezing mode at step S30 by gradually increasing the APU regeneration rate from a predetermined starting regeneration rate higher than the predetermined second APU regeneration rate within the range below a predetermined upper limit regeneration rate while the ambient temperature is lower than the predetermined second threshold temperature, the humidity is higher than the second threshold humidity, and the APU temperature is lower than a predetermined third threshold temperature, as long as the duty cycle of the compressor 3 is less than a predetermined first threshold duty cycle; and controlling the system in a second anti-freezing mode at step S40 with a predetermined third APU regeneration rate higher than the predetermined second APU regeneration rate when the ambient temperature is lower than the predetermined second threshold temperature, the humidity is higher than the second threshold humidity, the APU temperature is equal to or greater than the predetermined third threshold temperature, and the duty cycle of the compressor 3 is greater than a predetermined second threshold duty cycle.

In the first anti-freezing mode, the increase in APU regeneration rate may be controlled to occur by a predetermined regeneration rate increment at predetermined first threshold time intervals.

In the first anti-freezing mode, the duty cycle of the compressor 3 may be determined at the predetermined first threshold time intervals, and by comparing the determined duty cycle with the predetermined first threshold duty cycle, the increase in APU regeneration rate may be ensured to occur at each first threshold time interval.

In the second anti-freezing mode, the duty cycle of the compressor 3, which is compared with the predetermined second threshold duty cycle, may be determined at predetermined second threshold time intervals.

Here, the APU regeneration rate is determined as the ratio of the air amount used for regenerating the dehumidification cartridge 13 of the APU to the air amount charged in the air tank 7.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for controlling an air management system (AMS) of a vehicle, the method comprising:
   operating, by a controller, the AMS in an energy efficiency mode, a normal mode, a first anti-freezing mode, and a second anti-freezing mode with different air processing unit (APU) regeneration rates based on ambient temperature, humidity, APU temperature, and compressor duty cycle.

2. The method of claim 1,
   wherein the energy efficiency mode is a mode improving energy efficiency of the vehicle by being performed in a situation with no need for anti-freezing or for enhancement of dehumidification,
   wherein the normal mode is controlled by the controller with a higher APU regeneration rate than the energy efficiency mode in response that the dehumidification is required but the anti-freezing is not necessary,
   wherein the first anti-freezing mode is controlled by the controller with a higher APU regeneration rate than the normal mode in response that the anti-freezing is required in a section from a compressor to an APU, the APU regeneration rate being increased within a range below a predetermined upper limit regeneration rate while the compressor duty cycle is less than a predetermined first threshold duty cycle; and
   wherein the second anti-freezing mode is controlled by the controller with a higher APU regeneration rate than the normal mode in response that the anti-freezing is required in a section from the APU to the air tank.

3. The method of claim 2, wherein the energy efficiency mode is performed based on the ambient temperature being higher than a predetermined first threshold temperature and the humidity being lower than a predetermined first threshold humidity.

4. The method of claim 3, wherein the normal mode is performed based on the ambient temperature being equal to or greater than a predetermined second threshold temperature lower than the predetermined first threshold temperature and the humidity being equal to or greater than the predetermined first threshold humidity but equal to or lower than a predetermined second threshold humidity higher than the predetermined first threshold humidity.

5. The method of claim 4, wherein the first anti-freezing mode is performed based on the ambient temperature being lower than the predetermined second threshold temperature, the humidity being higher than the second threshold humidity, and the APU temperature being lower than a predetermined third threshold temperature.

6. The method of claim 5, wherein, in the first anti-freezing mode, the APU regeneration rate is increased from a predetermined starting regeneration rate by a predetermined regeneration rate increment within a range below an upper limit regeneration rate based on the compressor duty cycle being less than a first threshold duty cycle, and the compressor duty cycle is determined at predetermined first threshold time intervals to increase the APU regeneration rate at the first threshold time intervals.

7. The method of claim 5, wherein the second anti-freezing mode is activated based on the ambient temperature being lower than the predetermined second threshold temperature, the humidity being higher than the second threshold humidity, the APU temperature being equal to or greater than the predetermined third threshold temperature, and the compressor duty cycle being greater than a predetermined second threshold duty.

8. The method of claim 7, wherein the compressor duty cycle for comparison with the predetermined second threshold duty cycle is determined at predetermined second threshold time intervals.

9. A method for controlling an air management system (AMS) of a vehicle, the method comprising:
   controlling, by a controller, the air management system in an energy efficiency mode with a predetermined first air processing unit (APU) regeneration rate based on an ambient temperature being higher than a predetermined first threshold temperature and a humidity being lower than a predetermined first threshold humidity;
   controlling, by the controller, the air management system in a normal mode with a predetermined second APU regeneration rate higher than the predetermined first APU regeneration rate based on the ambient temperature being equal to or greater than a predetermined second threshold temperature lower than the predetermined first threshold temperature and the humidity being equal to or lower than a predetermined second threshold humidity higher than the predetermined first threshold humidity;
   controlling, by the controller, the air management system in a first anti-freezing mode increasing an APU regeneration rate from a predetermined starting regeneration rate higher than the predetermined second APU regeneration rate in a range below a predetermined upper limit regeneration rate while a compressor duty cycle is less than a predetermined first threshold duty cycle based on the ambient temperature being lower than the predetermined second threshold temperature, the humidity being higher than the second threshold humidity, and an APU temperature being lower than a predetermined third temperature; and controlling, by the controller, the air management system in a second anti-freezing mode with a predetermined third APU regeneration rate higher than the predetermined second APU regeneration rate based on the ambient temperature being lower than the predetermined second threshold temperature, the humidity being higher than the second threshold humidity, the APU temperature being the predetermined third threshold temperature, and the compressor duty cycle being greater than a predetermined second threshold duty cycle.

10. The method of claim 9, wherein the APU regeneration rate is controlled by the controller, in the first anti-freezing mode, to increase by a predetermined regeneration rate increment at predetermined first threshold time intervals.

11. The method of claim 10, wherein, in the first anti-freezing mode, the compressor duty cycle is determined at the predetermined first threshold time intervals and compared with the predetermined first threshold duty cycle to increase the APU regeneration rate at each first threshold time interval.

12. The method of claim 9, wherein, in the second anti-freezing mode, the compressor duty cycle to be compared with the predetermined second threshold duty cycle is determined at predetermined second threshold time intervals.

13. The method of claim 9, wherein the APU regeneration rate is determined as a ratio of an amount of air used for regenerating a dehumidification cartridge of an APU to an amount of air charged in an air tank.

14. An air management system (AMS) of a vehicle, the air management system comprising:
- a compressor producing compressed air;
- a dehumidification cartridge connected to the compressor and configured for removing impurities and moisture from the compressed air produced by the compressor; and
- an air tank connected to the air processing unit and storing the compressed air passing through the dehumidification cartridge;
- a controller electrically connected to the compressor, wherein the controller is configured for:
  - controlling the compressor in an energy efficiency mode with a predetermined first air processing unit (APU) regeneration rate based on an ambient temperature being higher than a predetermined first threshold temperature and a humidity being lower than a predetermined first threshold humidity;
  - controlling the compressor in a normal mode with a predetermined second APU regeneration rate higher than the predetermined first APU regeneration rate based on the ambient temperature being equal to or greater than a predetermined second threshold temperature lower than the predetermined first threshold temperature and the humidity being equal to or lower than a predetermined second threshold humidity higher than the predetermined first threshold humidity;
  - controlling the compressor in a first anti-freezing mode increasing an APU regeneration rate from a predetermined starting regeneration rate higher than the predetermined second APU regeneration rate in a range below a predetermined upper limit regeneration rate while a compressor duty cycle is less than a predetermined first threshold duty cycle based on the ambient temperature being lower than the predetermined second threshold temperature, the humidity being higher than the second threshold humidity, and an APU temperature being lower than a predetermined third temperature; and
  - controlling the compressor in a second anti-freezing mode with a predetermined third APU regeneration rate higher than the predetermined second APU regeneration rate based on the ambient temperature being lower than the predetermined second threshold temperature, the humidity being higher than the second threshold humidity, the APU temperature being the predetermined third threshold temperature, and the compressor duty cycle being greater than a predetermined second threshold duty cycle.

15. The apparatus of claim 14, wherein the APU regeneration rate is controlled by the controller, in the first anti-freezing mode, to increase by a predetermined regeneration rate increment at predetermined first threshold time intervals.

16. The apparatus of claim 15, wherein, in the first anti-freezing mode, the compressor duty cycle is determined at the predetermined first threshold time intervals and compared with the predetermined first threshold duty cycle to increase the APU regeneration rate at each first threshold time interval.

17. The apparatus of claim 14, wherein, in the second anti-freezing mode, the compressor duty cycle to be compared with the predetermined second threshold duty cycle is determined at predetermined second threshold time intervals.

18. The apparatus of claim 14, wherein the APU regeneration rate is determined as a ratio of an amount of air used for regenerating the dehumidification cartridge to an amount of air charged in the air tank.

* * * * *